July 26, 1960

E. A. RANDLETT 2,946,471

VENTING CLOSURE CAP

Filed Nov. 4, 1957

INVENTOR
EDWARD A. RANDLETT
BY
Rule & Hoge
ATTORNEYS

United States Patent Office 2,946,471
Patented July 26, 1960

2,946,471
VENTING CLOSURE CAP

Edward A. Randlett, Memphis, Tenn., assignor to Owens-Illinois Glass Company, a corporation of Ohio Filed Nov. 4, 1957, Ser. No. 694,425

3 Claims. (Cl. 215—56)

My invention relates to improvements in closure caps for bottles and jars and more particularly pertains to means providing both an effective inner seal and means for venting to the atmosphere any excessive air or gas under pressure that might be created within the container by reason of a substantial decrease in the ambient atmospheric pressure.

In U.S. patent issued to F. G. Pellett, No. 2,646,183, dated July 31, 1953, titled "Container Closure," there is disclosed a structure incorporating a membrane facing sheet or liner which initially is part of a closure cap assembly and is bonded to the container finish by means of an adhesive incident to securing the cap to the container. Such liner is tightly sealed to the glass throughout the circumference of the mouth opening and remains bonded thereto until torn therefrom by the consumer, following initial removal of the closure cap.

In the packaging of many products in bottles, jars and the like containers, whether or not the filled containers are vacuumized, an inner seal composed of glassine paper or some other suitable membrane material is used quite frequently, such being bonded to the mouth of the containers by an adhesive. In the event the ambient atmospheric pressure at the location of removal of the closure cap happens to be somewhat less than the pressure within the container, the inner seal may be rather violently displaced and the packed product blown out. With certain products the result of such action may be very harmful to the person involved and cause serious injury or in any event great discomfort.

An object of my invention is the provision of simple yet effective means for overcoming the described deficiency.

A further object is the provision of means whereby any substantial excess of internal pressure will separate one or more selected marginal portions of the inner seal from the container mouth or finish as the closure cap is being removed and permit a gradual balancing of the internal and external pressure.

It is also an object of my invention to coat a surface area of the glassine paper inner seal with wax, ink or some functionally equivalent material which will prevent effective bonding between the sealing sheet and container mouth in such area and thereby permit separation of the seal and container and consequent venting in a restricted zone.

Other objects will be in part apparent and in part pointed out hereinafter.

Figure 1:
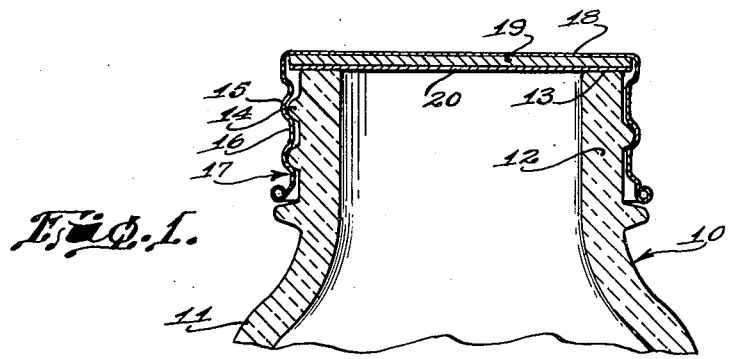
Fig. 1 is a fragmentary sectional elevational view of a jar and closure cap incorporating my invention.
Figure 2:
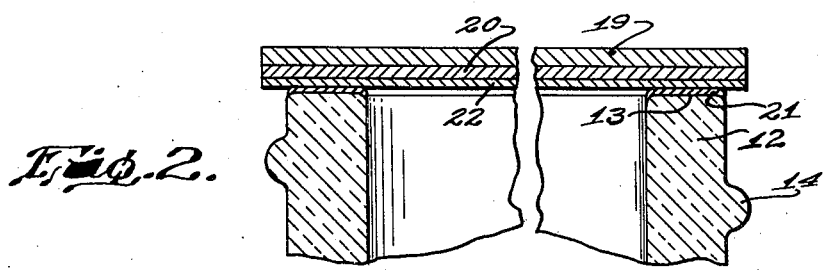
Fig. 2 is a view generally similar to Fig. 1, on a larger scale, with the closure cap removed and the inner seal still attached to the container.
Figure 3:
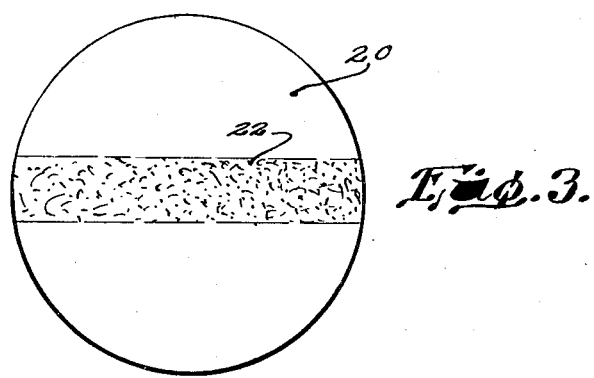
Fig. 3 is a plan view of the inner seal showing the coating in a selected area or zone to render ineffective in such area, the adhesive utilized in securing such seal to the container mouth.

In the illustrated embodiment of my invention it is shown in conjunction with a glass jar 10, although it is adaptable for use with bottles and other similar containers.

The jar comprises a body 11 having a neck 12 rising therefrom and terminating in an annular sealing surface 13 or rim. Screw threads 14 on the neck are intended for holding engagement with threads 15 on the skirt 16 of the closure cap 17. A panel or top portion 18 forms part of the closure cap and in contact with the interior surface of such panel is a cushion disk 19 of conventional or any preferred form. An inner seal 20 initially is carried by the closure cap and lies against the lower side of the cushion disk 19.

This inner seal, as explained heretofore, may be a membrane sheet of glassine paper or similar material of such diameter as to span the opening in the neck 12 and engage the sealing surface 13 throughout its circumference. A suitable adhesive 21 is applied to the sealing surface 13. Incident to threading the closure cap onto the jar, the adhesive effectively bonds the inner seal to the container neck where it remains until the ultimate consumer removes the closure cap and as a separate act tears the inner seal from the neck.

Figure 4:
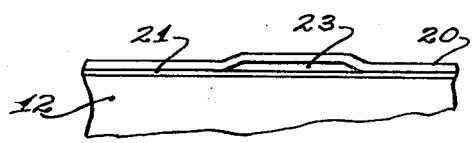
Fig. 4 is a fragmentary detail view showing the venting action of the inner seal.

To the end that the heretofore described venting may occur incident to initial separating movement of the closure cap away from the neck, the inner seal disk 20, on that side which will face the container, has a selected zone of relatively small dimensions coated with a film 22 of wax, ink or some material which will not bond to the adhesive. Thus although the inner seal will effectively preclude entry of oxygen, for example, into the container, it will, if circumstances as described prevail, permit upward flexing of the disk (Fig. 4) so that a small opening 23 is formed to effect a balance of internal and external air pressure.

Modifications may be resorted to within the spirit and scope of the appended claims.

I claim:

1. In a sealed package comprising a container, a neck defining a filling opening and terminating in an annular top rim or sealing surface, a closure cap telescoped over the neck, and screw threads for holding the cap and container together, a membrane inner seal within the closure cap and an adhesive on all portions of said rim for bonding the inner seal to the latter incident to threading of the closure cap onto said neck; the improvement which comprises coating a selected restricted area of the inner seal with a film of material incapable of bonding with the adhesive whereby to allow flexing of the seal and separation of the latter from the rim in such area upon separation of the closure cap and rim in the presence of pressure conditions wherein the pressure within the sealed package substantially exceeds that of the ambient atmosphere.

2. The improvement defined in claim 1, the coating material being a wax-like substance.

3. The improvement defined in claim 1, the coating being a film of wax extending diametrically across a selected narrow zone of one side of the seal.

References Cited in the file of this patent

UNITED STATES PATENTS

| 1,103,177 | Dye | July 14, 1914 |
| 1,787,959 | Scofield | Jan. 6, 1931 |
| 2,620,939 | Weisgerber | Dec. 9, 1952 |
| 2,626,073 | Miller et al. | Jan. 20, 1953 |
| 2,735,565 | Wheaton et al. | Feb. 21, 1956 |